(12) United States Patent
Benedict (10) Patent No.: US 8,113,254 B2
(45) Date of Patent: Feb. 14, 2012

(54) SELF-INFLATING TIRE

(75) Inventor: Robert Leon Benedict, Tallmadge, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 12/643,176

(22) Filed: Dec. 21, 2009

(65) Prior Publication Data

US 2011/0146867 A1    Jun. 23, 2011

(51) Int. Cl.
 *B60C 25/00* (2006.01)
(52) U.S. Cl. ......................................... 152/426; 152/419
(58) Field of Classification Search .................. 152/415, 152/418, 419, 423–426
See application file for complete search history.

(56) References Cited

U.S. PATENT DOCUMENTS

| | | | | |
|---|---|---|---|---|
| 638,628 A | * | 12/1899 | Everrett | 152/425 |
| 1,050,886 A | * | 1/1913 | Wetherell | 152/426 |
| 1,134,361 A | * | 4/1915 | Wetherell | 152/426 |
| 3,304,981 A | * | 2/1967 | Sheppard | 152/426 |
| 4,922,984 A | * | 5/1990 | Dosjoub et al. | 152/415 |
| 7,225,845 B2 | * | 6/2007 | Ellmann | 152/426 |

FOREIGN PATENT DOCUMENTS

| | | |
|---|---|---|
| DE | 3433318 | 3/1985 |
| WO | 2005/012009 A1 | 2/2005 |
| WO | 2007/134556 A1 | 11/2007 |

OTHER PUBLICATIONS

European Search Report completed Aug. 19, 2011.

* cited by examiner

*Primary Examiner* — Jason Bellinger
(74) *Attorney, Agent, or Firm* — Richard B. O'Planick (57) ABSTRACT

A self-inflating tire assembly includes an annular air tube connected to a tire and defining an annular air passageway, the air tube being composed of a flexible material operative to allow an air tube segment opposite a tire footprint to flatten, closing the passageway, and resiliently unflatten into an original configuration. The air tube is sequentially flattened by the tire footprint in a direction opposite to a tire direction of rotation to pump air along the passageway to an inlet device for exhaust from the passageway or to an outlet device for direction into the tire cavity. The inlet device is positioned within the annular passageway 180 degrees opposite the outlet device such that sequential flattening of the air tube by the tire footprint effects pumping of air along the air passageway with the tire rotating in either a forward or reverse direction of rotation.

17 Claims, 11 Drawing Sheets

SELF-INFLATING TIRE

FIELD OF THE INVENTION

The invention relates generally to self-inflating tires and, more specifically, to a pump mechanism for such tires.

BACKGROUND OF THE INVENTION

Normal air diffusion reduces tire pressure over time. The natural state of tires is under inflated. Accordingly, drivers must repeatedly act to maintain tire pressures or they will see reduced fuel economy, tire life and reduced vehicle braking and handling performance. Tire Pressure Monitoring Systems have been proposed to warn drivers when tire pressure is significantly low. Such systems, however, remain dependant upon the driver taking remedial action when warned to reinflate a tire to recommended pressure. It is a desirable, therefore, to incorporate a self-inflating feature within a tire that will self-inflate the tire in order to compensate for any reduction in tire pressure over time without the need for driver intervention.

SUMMARY OF THE INVENTION

In one aspect of the invention, a self-inflating tire assembly includes an annular air tube connected to a tire and defining an annular air passageway, the air tube being composed of a flexible material operative to allow an air tube segment opposite a tire footprint to flatten and resiliently unflatten into an original conduit condition when a rotation of the tire moves the tire footprint opposite a different air tube segment. The air tube is sequentially flattened in a direction opposite to a tire direction of rotation to pump air along the air passageway to an inlet device for exhaust, or to an outlet device for directing pumped air to the tire cavity.

In another aspect, the inlet and outlet devices include T-configured bodies positioned within the annular passageway of the annular air tube, each having oppositely directed first and second sleeves connected to the annular air tube and in communication with the annular air passageway. A one-way outlet valve mechanism is positioned within the first and second outlet sleeve passageways.

In yet another aspect, the pump assembly is bi-directional wherein the outlet device and the inlet device are mounted to the annular air tube 180 degrees apart. The air tube is sequentially flattened by the tire footprint to pump air along the passageway in a direction opposite a tire direction of rotation with the tire rotating in either a forward direction of rotation or a reverse direction of rotation. The tube is open for a substantial portion of its length. The tube is embedded in the tire so that the deformation of the tire under load closes a segment of the tube.

Definitions

"Aspect ratio" of the tire means the ratio of its section height (SH) to its section width (SW) multiplied by 100 percent for expression as a percentage.

"Asymmetric tread" means a tread that has a tread pattern not symmetrical about the center plane or equatorial plane EP of the tire.

"Axial" and "axially" means lines or directions that are parallel to the axis of rotation of the tire.

"Chafer" is a narrow strip of material placed around the outside of a tire bead to protect the cord plies from wearing and cutting against the rim and distribute the flexing above the rim.

"Circumferential" means lines or directions extending along the perimeter of the surface of the annular tread perpendicular to the axial direction.

"Equatorial Centerplane (CP)" means the plane perpendicular to the tire's axis of rotation and passing through the center of the tread.

"Footprint" means the contact patch or area of contact of the tire tread with a flat surface at zero speed and under normal load and pressure.

"Groove" means an elongated void area in a tread that may extend circumferentially or laterally about the tread in a straight, curved, or zigzag manner. Circumferentially and laterally extending grooves sometimes have common portions. The "groove width" is equal to tread surface area occupied by a groove or groove portion, the width of which is in question, divided by the length of such groove or groove portion; thus, the groove width is its average width over its length. Grooves may be of varying depths in a tire. The depth of a groove may vary around the circumference of the tread, or the depth of one groove may be constant but vary from the depth of another groove in the tire. If such narrow or wide grooves are substantially reduced depth as compared to wide circumferential grooves which the interconnect, they are regarded as forming "tie bars" tending to maintain a rib-like character in tread region involved.

"Inboard side" means the side of the tire nearest the vehicle when the tire is mounted on a wheel and the wheel is mounted on the vehicle.

"Lateral" means an axial direction.

"Lateral edges" means a line tangent to the axially outermost tread contact patch or footprint as measured under normal load and tire inflation, the lines being parallel to the equatorial centerplane.

"Net contact area" means the total area of ground contacting tread elements between the lateral edges around the entire circumference of the tread divided by the gross area of the entire tread between the lateral edges.

"Non-directional tread" means a tread that has no preferred direction of forward travel and is not required to be positioned on a vehicle in a specific wheel position or positions to ensure that the tread pattern is aligned with the preferred direction of travel. Conversely, a directional tread pattern has a preferred direction of travel requiring specific wheel positioning.

"Outboard side" means the side of the tire farthest away from the vehicle when the tire is mounted on a wheel and the wheel is mounted on the vehicle.

"Peristaltic" means operating by means of wave-like contractions that propel contained matter, such as air, along tubular pathways.

"Radial" and "radially" means directions radially toward or away from the axis of rotation of the tire.

"Rib" means a circumferentially extending strip of rubber on the tread which is defined by at least one circumferential groove and either a second such groove or a lateral edge, the strip being laterally undivided by full-depth grooves.

"Sipe" means small slots molded into the tread elements of the tire that subdivide the tread surface and improve traction, sipes are generally narrow in width and close in the tires footprint as opposed to grooves that remain open in the tire's footprint.

"Tread element" or "traction element" means a rib or a block element defined by having a shape adjacent grooves.

"Tread Arc Width" means the arc length of the tread as measured between the lateral edges of the tread.

BRIEF DESCRIPTION OF THE DRAWINGS

The invention will be described by way of example and with reference to the accompanying drawings in which.

DETAILED DESCRIPTION OF THE INVENTION

Figure 1:
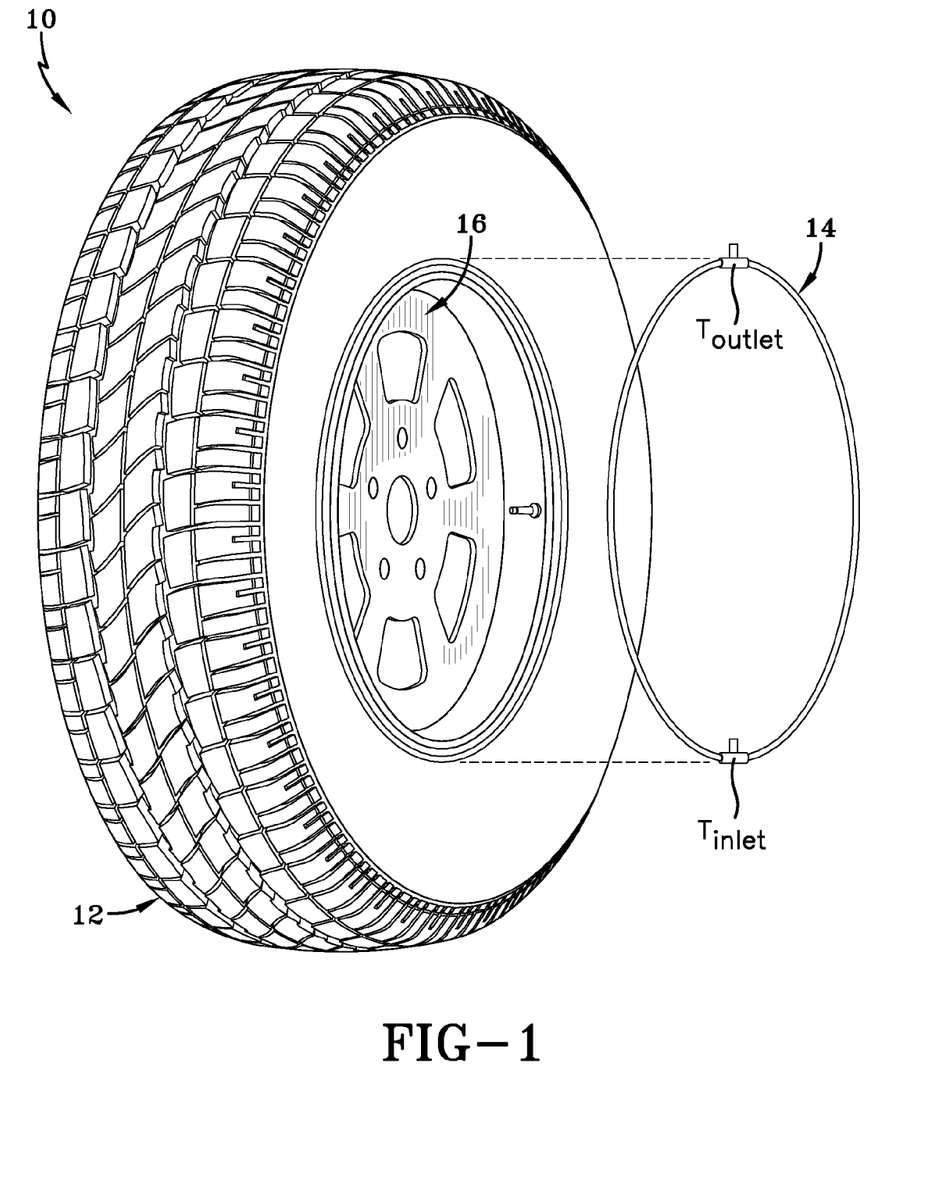
FIG. 1 is an isometric view of tire, rim and tubing with peristaltic pump and inlet valve.
Figure 5:
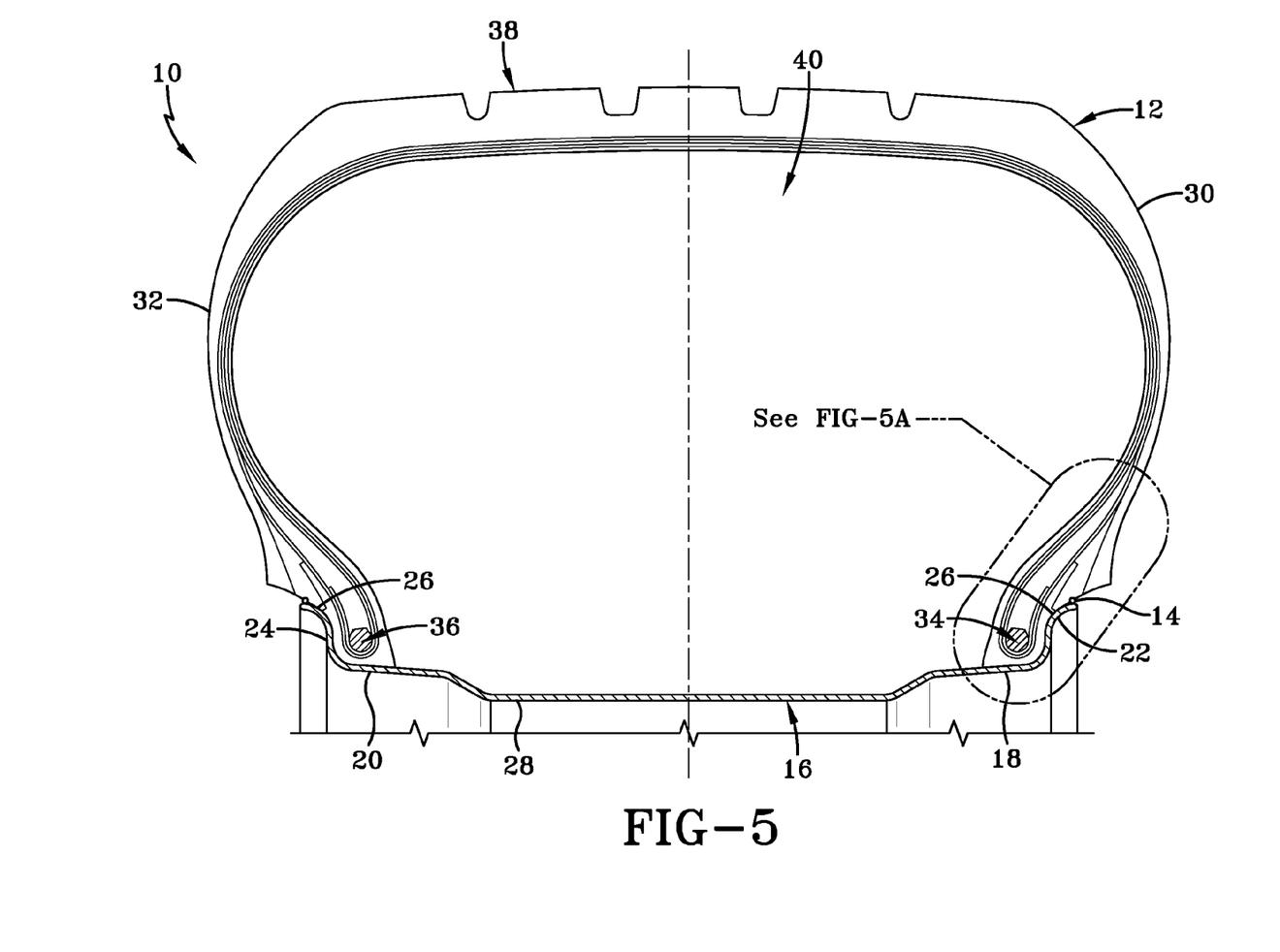
FIG. 5 is a partial section view through the tire at 180 degrees from road surface.
Figure 5A:
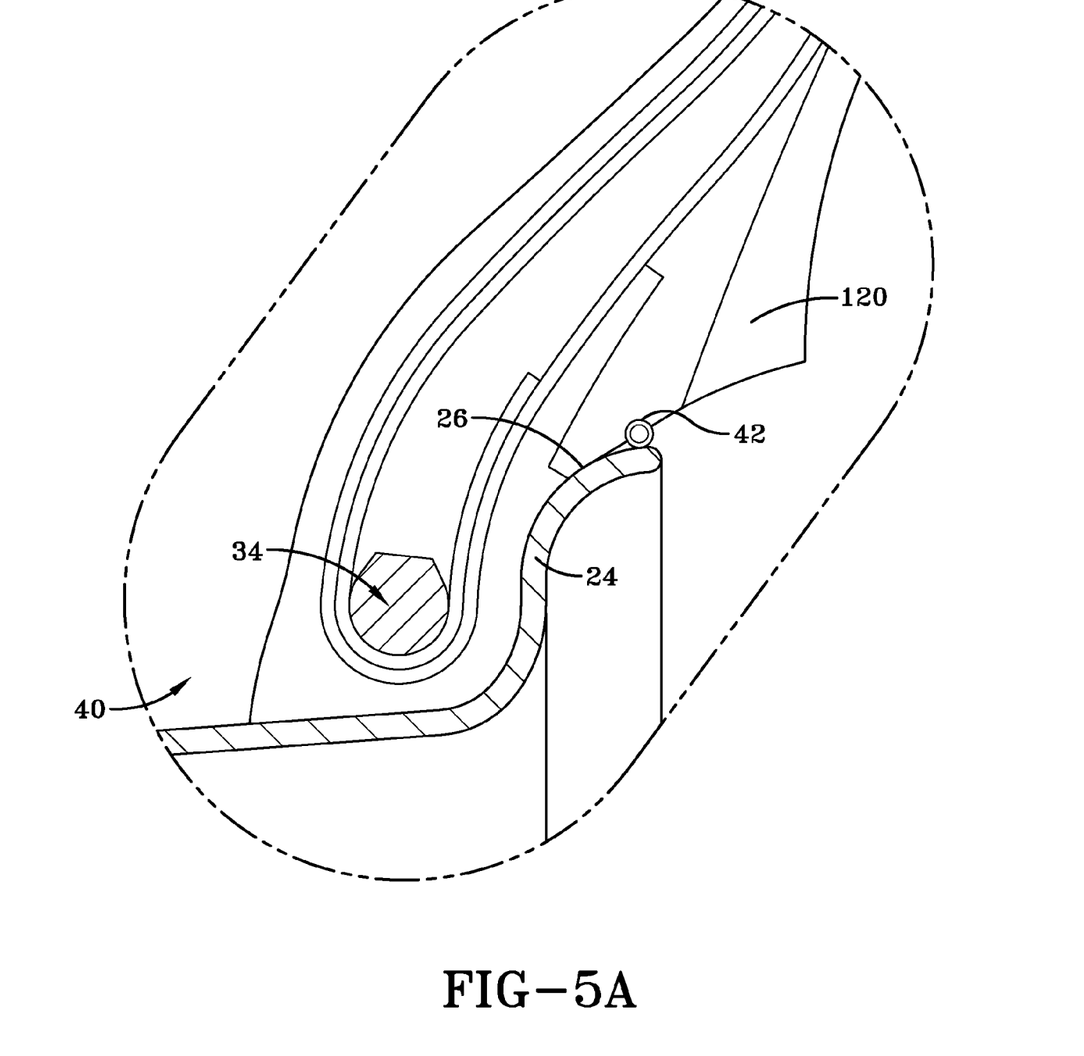
FIG. 5A is an enlarged view of tube location next to rim.

Referring to FIGS. 1 and 5, a tire assembly 10 includes a tire 12, a peristaltic pump assembly 14, and a tire wheel 16. The tire mounts in conventional fashion to a pair of rim mounting surfaces 18, 20 adjacent outer rim flanges 22, 24. The rim flanges 22, 24, have radially outward facing surface 26. A rim body 28 supports the tire assembly as shown. The tire is of conventional construction, having a pair of sidewalls 30, 32 extending from opposite bead areas 34, 36 to a crown or tire read region 38. The tire and rim enclose a tire cavity 40.

Figure 2:
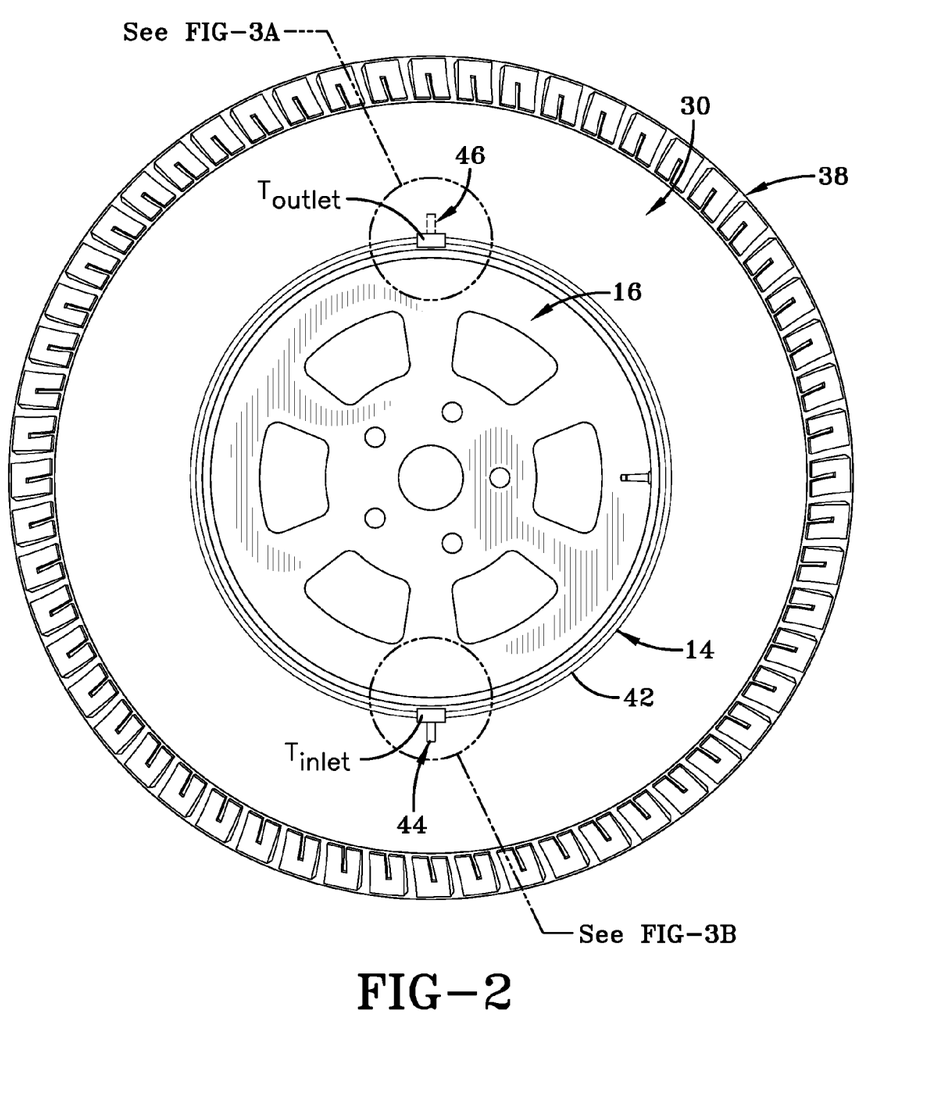
FIG. 2 is a side view of tire with location of tubing and valves and showing user set valve location.
Figure 3A:
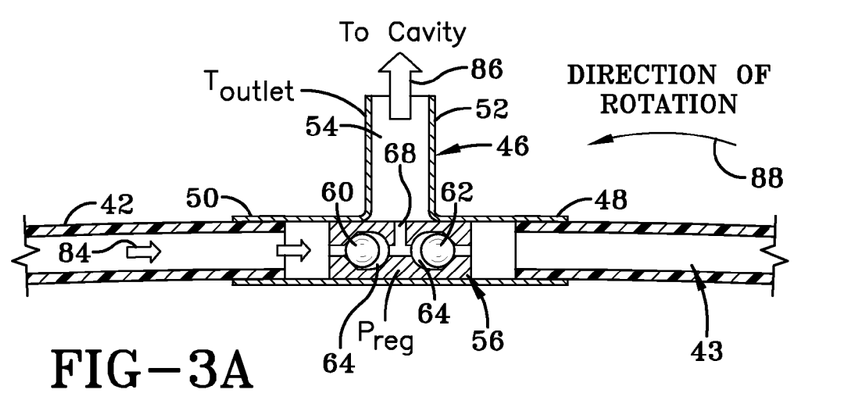
FIG. 3A is an enlarged fragmentary view of pump for outlet to tire cavity.

As seen from FIGS. 2 and 3A, B, and C, the peristaltic pump assembly 14 includes an annular air tube 42 that encloses an annular passageway 43. The tube 42 is formed of a resilient, flexible material such as plastic or rubber compounds that is capable of withstanding repeated deformation cycles wherein the tube is deformed into a flattened condition subject to external force and, upon removal of such force, returns to an original condition generally circular in cross-section. The tube is of a diameter sufficient to operatively pass a volume of air sufficient for the purposes described herein and allowing a positioning of the tube in an operable location within the tire assembly as will be described.

The peristaltic pump assembly 14 further includes an inlet device 44 and an outlet device 46 spaced apart approximately 180 degrees at respective locations within the air tube 42. The outlet device 46 has a T-shaped configuration in which T-sleeves 48, 50 join at one end to an outlet sleeve 52. An internal outlet passageway 54 extends through the outlet sleeve 52 and is in air flow communication with the tire cavity 40. Situated within an axial chamber of each of the T-sleeves 48, 50 is a valve unit 56 positioned opposite and in air-flow communication with the outlet passageway 54 of the outlet sleeve 52. The valve unit 56 is of a conventional type commercially available, and includes a pair of one-way ball valves 60, 62, each seated within a respective ball valve chamber 64. The ball valves 60, 62 are spring biased (not shown) in conventional manner into a normally closed configuration closing off the outlet passageway 54. When air from the passageway 43 impinges on the ball valves 60, 62 with a sufficient pressure to overcome the tire cavity biasing pressure, the ball valves move rearward and the T-outlet is open to the passage of air from passageway 43 out of the outlet passageway 54. The magnitude of bias necessary for the air from passageway 43 to overcome can be set so as to regulate the flow of air out of the outlet device 46 by also incorporating a biasing spring (not shown) against each ball valve 60, 62, biasing with the tire cavity pressure the ball valves into a closed position. The air from tube passageway 43 must be of sufficient pressure to overcome the tire cavity pressure and biasing spring pressure for the ball valves to move into an open position, whereby starting a flow of air into the tire cavity 40.

The inlet device 44 is similarly of T-shaped configuration having a pair of co-axial inlet sleeve segments 70, 72 co-aligned with an inlet portal sleeve 74. An air passageway 76 extends through the inlet portal sleeve 74 and permits the flow of air therethrough into and out of the air passageway of the tube 42. A filter 80 may be positioned within the inlet portal sleeve 74. Filter 80 is composed of a porous filtering agent of a type conventionally available. So positioned within the sleeve 74, the filter 80 purifies air entering the tube passageway 43, identified in FIG. 3B as "outside air". A back flow of air out of passageway 43, through the filter 80 within sleeve 74, operates to self-clean the filter by forcing our particles trapped within the porous filtering medium. An insert T-body 82 resides within the inlet device 44 and serves to line the sleeves 70, 72.

As will be appreciated from FIGS. 3A-C and 4A, the inlet device 44 and the outlet device 46 are positioned within the circular air tube 42 generally 180 degrees apart. The tire rotates in a direction of rotate 88, causing a footprint 100 to be formed against the ground surface 98. A compressive force 104 is directed into the tire from the footprint 100 and acts to flatten a segment 110 of the air tube passageway 43 as shown at numeral 106. Flattening of the segment 110 of the passageway 43 forces air from the segment along tube passageway 43 in the direction shown by arrow 84, toward the outlet device 46.

Figure 4A:
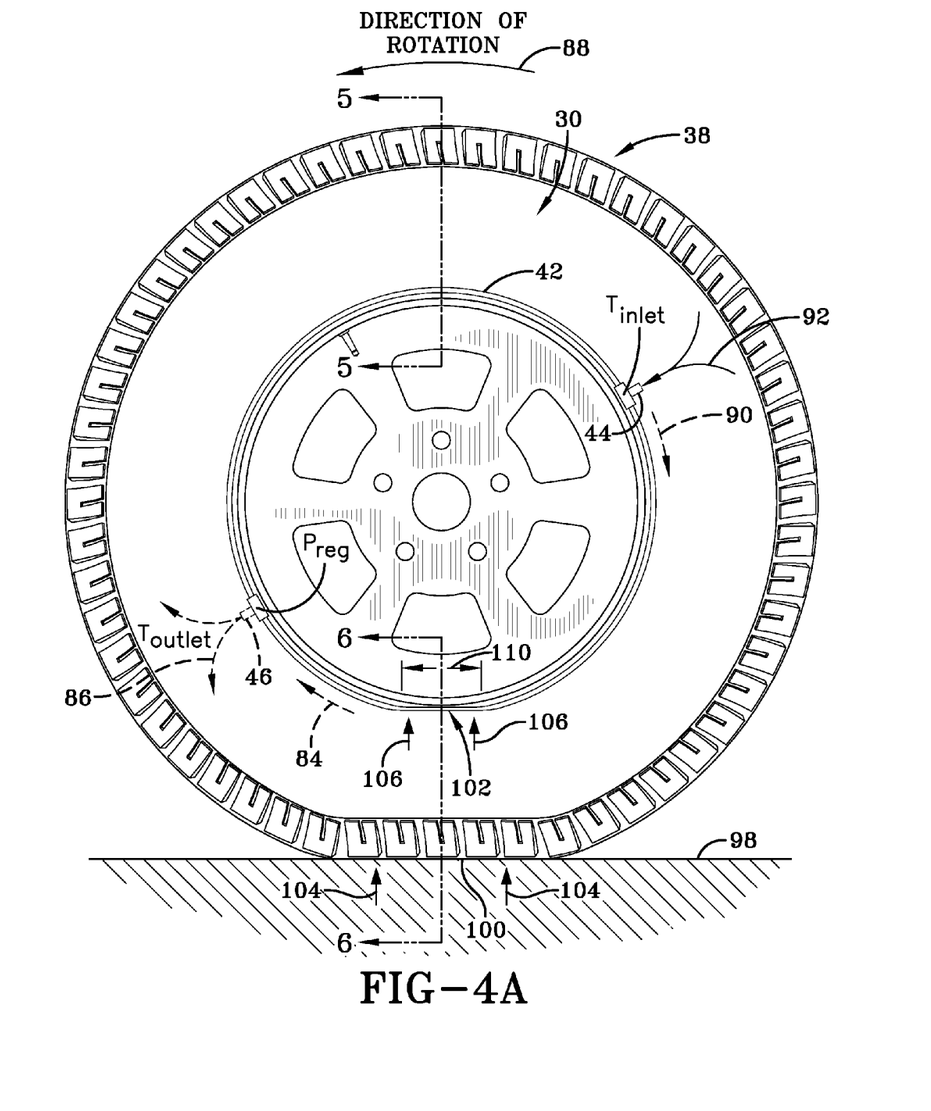
FIG. 4A is a side view of tire, rim, tubing, and valves showing operation of the pump to cavity flow when the tire rotates.

As the tire continues to rotate in direction 88 along the ground surface 98, the tube 42 will be sequentially flattened or squeezed opposite the tire footprint segment by segment in a direction opposite to the direction of tire rotation 88. The sequential flattening of the tube passageway 43 segment by segment causes evacuated air from the flattened segments to be pumped in the direction 84 within tube passageway 43 to the outlet device 46. When the air flow is sufficient against ball valve 60, the valve will open and allow air to flow through the outlet device 46 to the tire cavity as shown at 86. As referenced by arrow 86, air exiting the outlet device sleeve 52 is routed to the tire cavity 40 and serves to re-inflate the tire to a desired pressure level. The tire cavity pressure acts against the ball valves 60, 62 in combination with any ancillary biasing spring (not shown) which must be overcome by the air pressure within the tube passageway 43 in order for the ball valve to open.

Figure 3B:
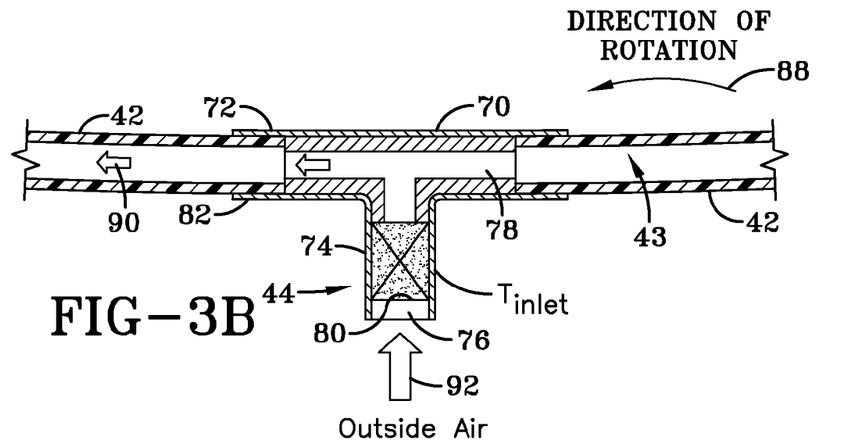
FIG. 3B is enlarged fragmentary view of inlet and filter.
Figure 3C:
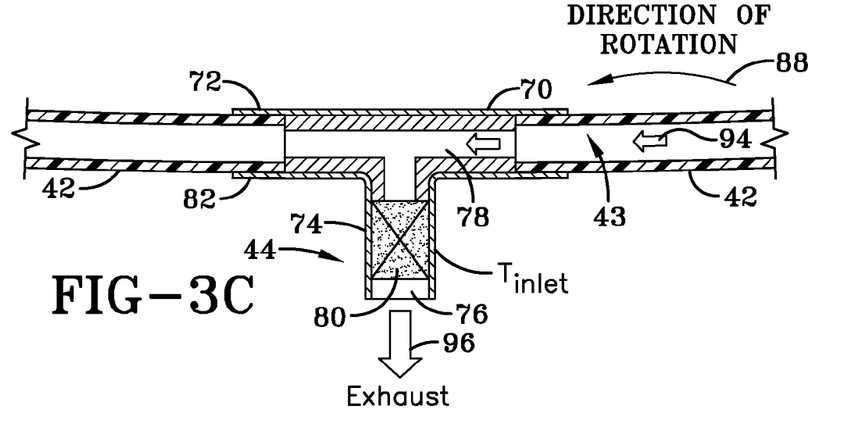
FIG. 3C is an enlarged fragmentary view of inlet and filter in the exhaust mode.
Figure 4B:
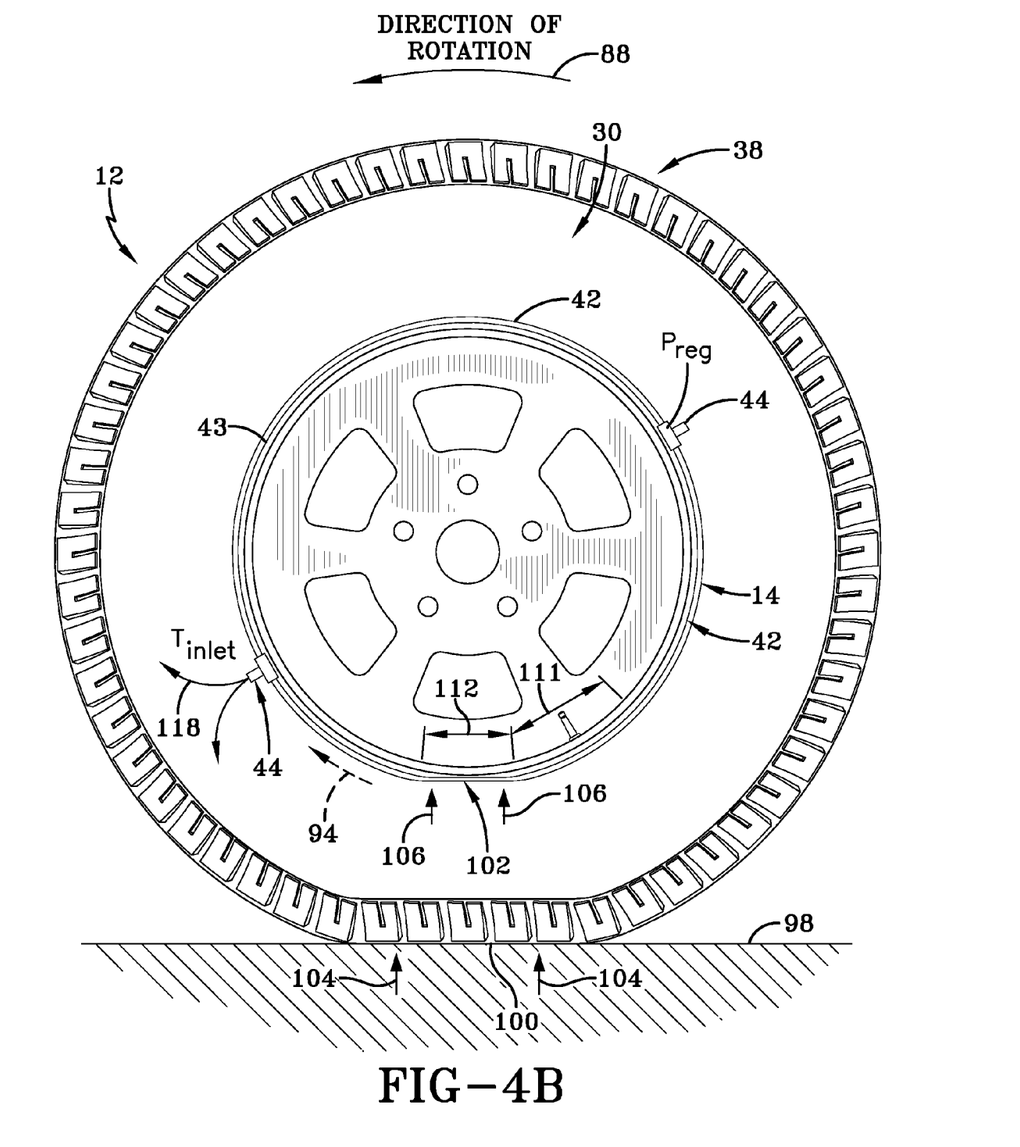
FIG. 4B is a side view of the tire, rim, tubing, and valves showing operation of flow back out of the filter (cleaning) when the tire rotates.

With the tire rotating in direction 88, flattened tube segments are sequentially refilled by air 92 flowing into the inlet device 44 along the passageway 43 in the direction 90 as shown by FIGS. 3B and 4A. The inflow of air from the inlet device 44 in direction 90 continues until the outlet device 46, rotating counterclockwise as shown with the tire rotation 88, passes the tire footprint 100. FIG. 3C and FIG. 4B show the orientation of the peristaltic pump assembly 14 in such a position. In the position shown, the tube 42 continues to be sequentially flattened segment by segment opposite the tire footprint by compressive force 104 as shown at numeral 106. Air is pumped in the clockwise direction 94 to the inlet device 44 where it is evacuated or exhausted from the passageway 43. Passage of exhaust air 96 from the inlet device 44 is through the filter 80 which acts to self-clean the filter of accumulated debris or particles within the porous medium. With the evacuation of pumped air out of the inlet device 44, the outlet device is in the closed position and air does not flow therefrom to the tire cavity. When the tire rotates further in counterclockwise direction 88 until the inlet device 44 passes the tire footprint 100 (as shown in FIGS. 3A, 3B, and 4A), the airflow resumes to the outlet device 46, opening the ball valve within the outlet device 46, and causing the pumped air to flow out (86) to the tire cavity 40.

FIG. 4B illustrates that the tube 42 is flattened 102 segment by segment as the tire rotates in direction 88. A flattened segment 111 moves counterclockwise in direction 88 with the tire as an adjacent segment 112 moves opposite the tire footprint. Accordingly, the progression of squeezed or flattened tube segments can be seen to move in a clockwise direction, counter to the tire rotation in direction 88. As segment 111 moves away from the footprint 100, the compression forces within the tire from the footprint region are eliminated and the segment 111 is free to resiliently reconfigure into an unflattened state as segment 111 refills with air from passageway 43. In the original unflattened configuration segments of the tube 42 are generally circular in section.

The above-described cycle is then repeated for each tire revolution, half of each rotation resulting in pumped air going to the tire cavity and half of the rotation the pumped air is directed back out the inlet device filter 80 to self-clean the filter. It will be appreciated that while the direction of rotation 88 of the tire 12 is shown in FIGS. 4A and 4B to be counterclockwise, the subject tire assembly and its peristaltic pump assembly 14 will function in like manner in a (clockwise) reverse direction of rotation to that shown at numeral 88. The peristaltic pump is accordingly bi-directional and equally functional with the tire assembly moving in a forward or a reverse direction of rotation.

Figure 6:
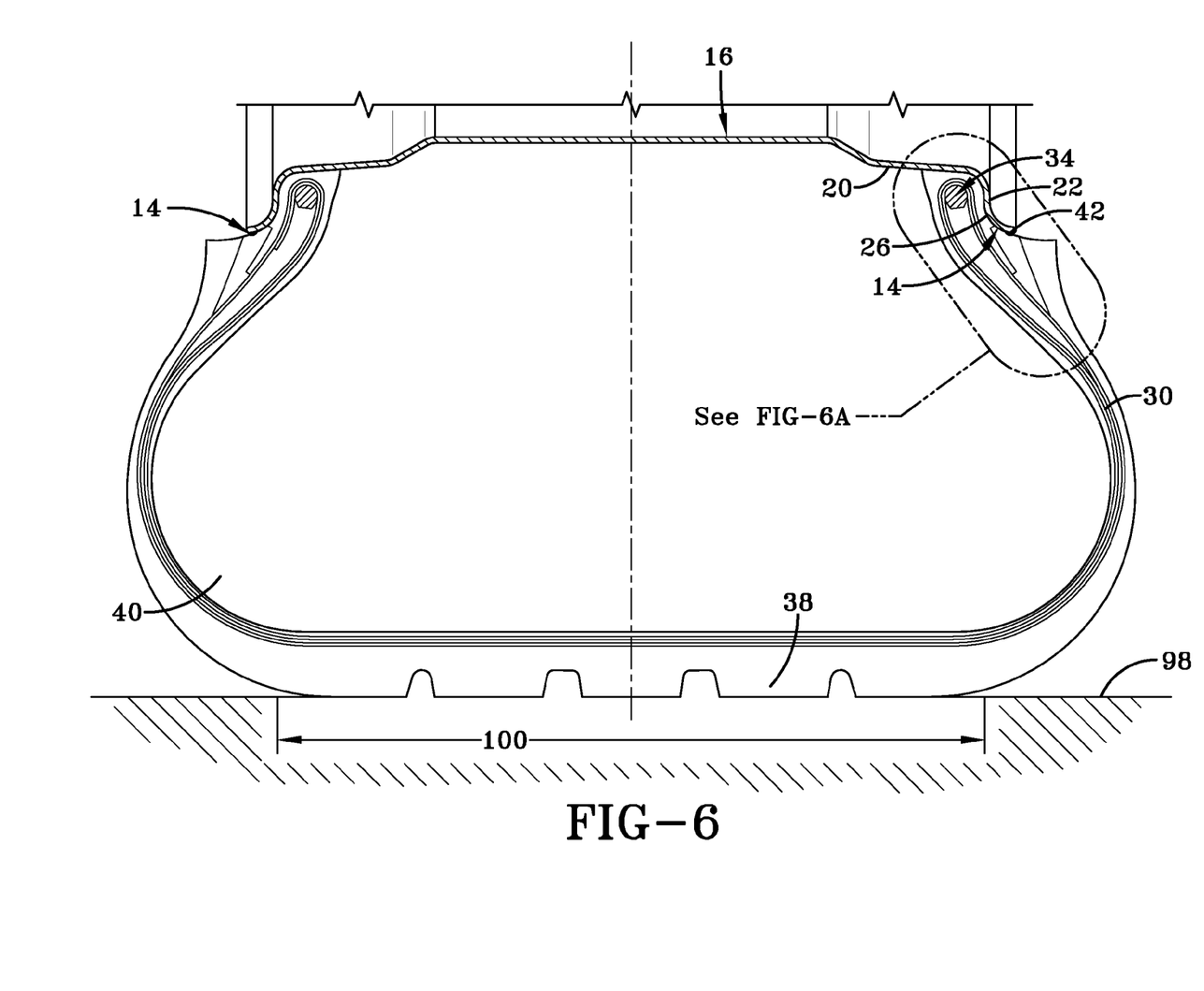
FIG. 6 is a partial section view through the tire at road surface.
Figure 6A:
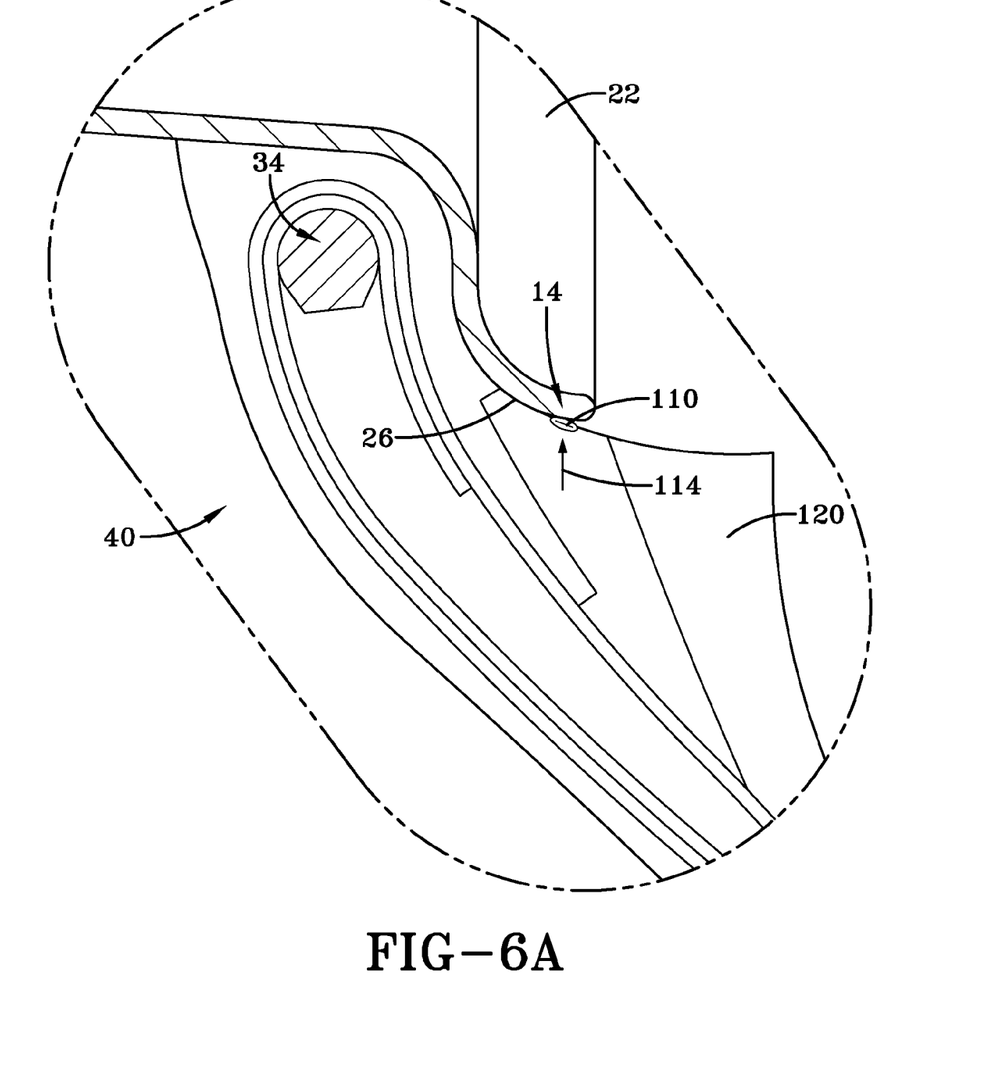
FIG. 6A is an enlarged view of the tube compressed against the rim.

The location of the peristaltic pump assembly will be understood from FIGS. 6 and 6A. In one embodiment, the peristaltic pump assembly 14 is positioned between the rim flange surface 26 and a lower bead region 34 of the tire 12. So positioned, the air tube 42 is radially inward from the tire footprint 100 and is thus positioned to be flattened by forces directed from the tire footprint as described above. The segment 110 that is opposite the footprint 100 will flatten from the compressive force 114 from the footprint 100 pressing the tube segment against the rim flange surface 26. The positioning of the tube 42 is specifically shown as between a chafer 120 of the tire at the bead region 34 and the rim surface 26. The diametric sizing of the peristaltic pump air tube 42 is selected to span the circumference of the rim flange surface 26.

The regulation of pressure may be effected in one approach by the condition that if P (at the chamber 68)<Pset, the valve opens to the cavity and air is admitted from the tube 42. If P>Pset, the ball valves remain closed and air vents to the outside via the inlet device 44. A second option is to set the pressure Pset such that if P<Pset, the valve opens to the cavity and if P>Pset, the one way ball valves 60, 62 within the outlet device 46 are bypassed and air re-circulates in the tube passageway 43.

Figure 7A:
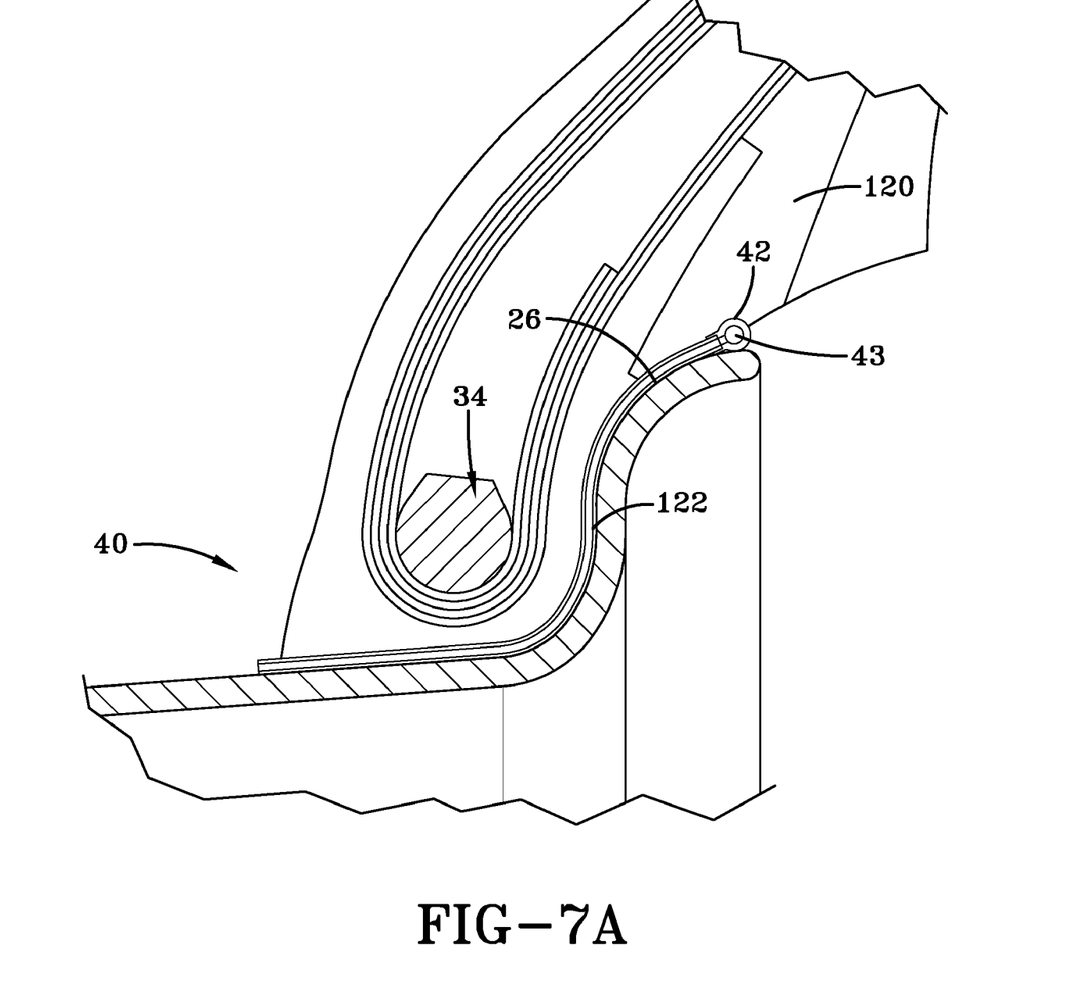
FIG. 7A is an enlarged view of the passageway from the pump/tube to the tire inner cavity.
Figure 7B:
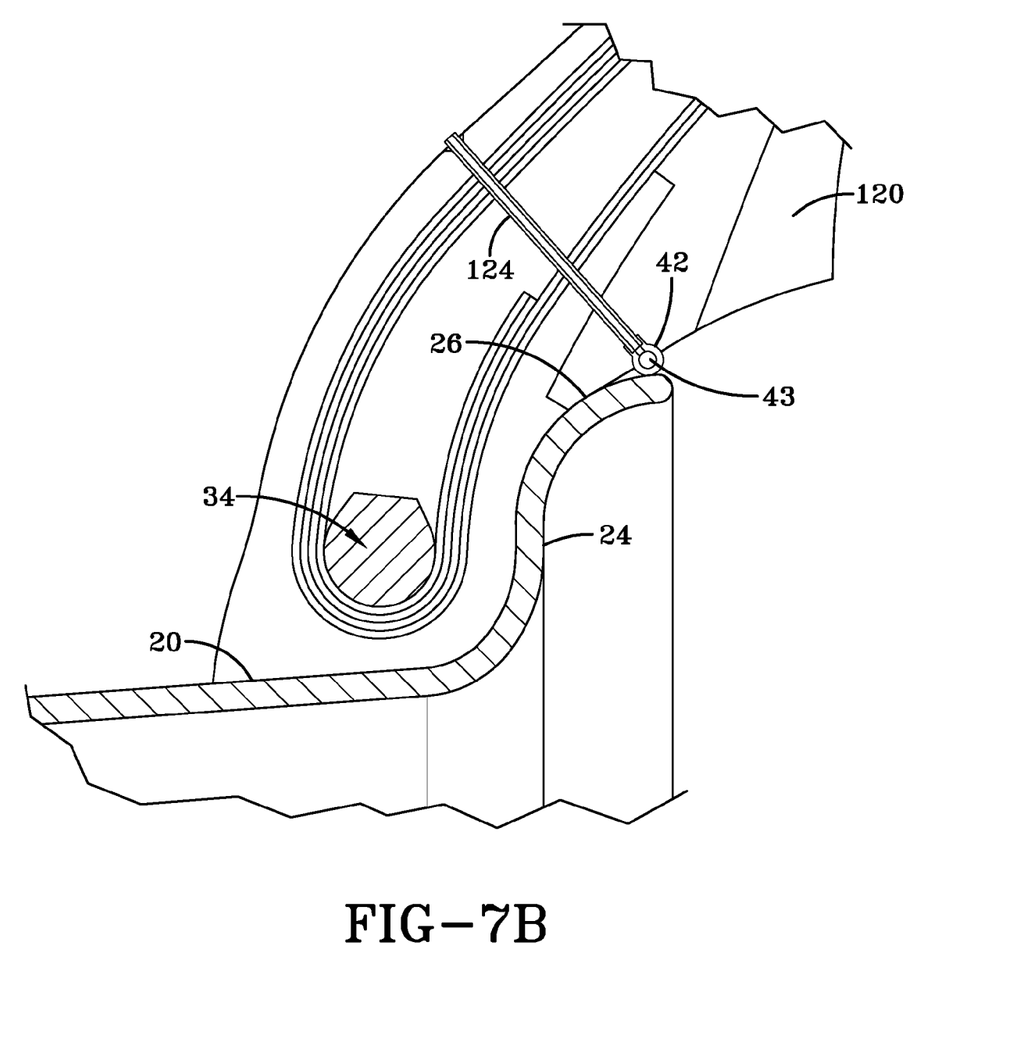
FIG. 7B is an enlarged view of an alternate passageway location.

FIG. 7A shows a tube member 122 extending from the outlet device 46 between the lower bead region 34 of the tire into the tire cavity 40. FIG. 7B shows a second alternative embodiment in a tube 124 is positioned to extend through the sidewall of the tire and into the tire cavity.

From the forgoing, it will be appreciated that the subject invention provides a bi-directionally peristaltic pump for a self-inflating tire in which a circular air tube 42 flattens segment by segment and closes in the tire footprint 100. The air inlet T-device 44 may include a filter 80 and be self-cleaning. The outlet T-device 46 employs a valve unit that may be configured as two one-way valves such as, but not limited to, the ball valves 60, 62. The peristaltic pump assembly 14 pumps air under rotation of the tire in either direction, one half of a revolution pumping air to the tire cavity 40 and the other half of a revolution pumping air back out of the inlet device 44 (filter 80). The peristaltic pump assembly 14 may be used with a secondary tire pressure monitoring system (TPMS) (not shown) of conventional configuration that serves as a system fault detector. The TPMS may be used to detect any fault in the self-inflation system of the tire assembly and alert the user of such a condition.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A self-inflating tire assembly comprising:
   a rim having a tire mounting surface extending between first and second rim flanges;
   a tire mounted to the rim tire mounting surface, the tire having a tire cavity, first and second sidewalls extending respectively from first and second tire bead regions to a tire tread region;
   an annular air tube connected to the tire and defining an annular air passageway, the air tube being composed of a flexible material operative to allow an air tube segment radially opposite a tire footprint to flatten and substantially close the annular passageway, the tire footprint in a rotating tire being operative to flatten the annular air tube segment by segment to pump air from the flattened air tube segments along the annular air passageway;
   an inlet device positioned within the annular passageway operative to pass air into and out of the annular passageway;
   an outlet device positioned within the annular passageway at a location substantially 180 degrees apart opposite the inlet device, the outlet device operative in an open position to pass pumped air along the annular air passageway into the tire cavity;
   wherein the inlet device comprises a T-configured inlet mechanism positioned within the annular passageway of the annular air tube, the inlet mechanism having oppositely directed first and second inlet sleeves connected to the annular air tube and in communication with the annular air passageway; the inlet device further having an inlet portal disposed between the first and second inlet sleeve passageways operatively positioned to pass air in and out of the inlet device first and second inlet sleeve passageways; the outlet device comprising a T-configured outlet mechanism positioned within the annular passageway, the outlet mechanism having oppositely directed first and second outlet sleeves connected to the annular air tube and in communication with the annular air passageway; the outlet mechanism further having one-way valve means within the first and second outlet sleeve passageways operative in an open condition to pass air from an outlet sleeve passageway out of the outlet device and into the tire cavity.

2. The tire assembly of claim 1, wherein the air tube is sequentially flattened by the tire footprint to pump air along the air passageway in either a forward tire direction of rotation or a reverse tire direction of rotation.

3. The tire assembly of claim 2, wherein the air tube sequentially flattens to pump air along the air passageway to the inlet and outlet devices in either the forward or reverse tire directions of rotation.

4. The tire assembly of claim 3, wherein a flattened tube segment resiliently returns to an un-flat condition when repositioned by tire rotation outside the tire tread footprint.

5. The tire assembly of claim 4, wherein the outlet device and the inlet device are mounted to the annular air tube substantially 180 degrees apart.

6. The tire assembly of claim 1, wherein the annular air tube is substantially of circular configuration.

7. The tire assembly of claim 1, wherein the annular air tube is positioned between a tire bead region and a rim flange radially inward of the tire tread region.

8. The tire assembly of claim 1, wherein the annular air tube is positioned between a tire bead region and the rim tire mounting surface radially inward of the tire tread region.

9. The tire assembly of claim 1, wherein the outlet device comprises an outlet portal tube extending from the outlet device to the tire cavity.

10. The tire assembly of claim 1, wherein the air tube comprises a substantially circular array of air tube segments that sequentially flatten segment by segment radially opposite a tire footprint as the tire assembly rotates against a ground surface.

11. The tire assembly of claim 10, wherein the array of air tube segments flatten segment by segment and pump displaced air from the flattened tube segments to the outlet device and the inlet device.

12. The tire assembly of claim 1, wherein further comprising a porous filter member positioned within an air portal of the inlet device.

13. A self-inflating tire assembly comprising:
a rim having a tire mounting surface extending between first and second rim flanges;
a tire mounted to the rim tire mounting surface, the tire having a tire cavity, first and second sidewalls extending respectively from first and second tire bead regions to a tire tread region;
an annular air tube connected to the tire and defining an annular air passageway, the air tube being composed of a flexible material operative to allow an air tube segment radially opposite a tire footprint to flatten and substantially close the annular passageway, the tire footprint in a rotating tire being operative to flatten the annular air tube segment by segment to pump air from the flattened air tube segments along the annular air passageway;
an inlet device positioned within the annular passageway operative to pass air into and out of the annular passageway;
an outlet device positioned within the annular passageway at a location substantially opposite the inlet device, the outlet device operative in an open position to pass pumped air along the annular air passageway into the tire cavity; and
wherein the outlet device and the inlet device are mounted to the annular air tube substantially 180 degrees apart.

14. The tire assembly of claim 13, wherein the air tube sequentially flattens in a direction counter to a tire direction of rotation to operatively pump air along the air passageway to the inlet device and the outlet device in either a forward tire direction of rotation or a reverse tire direction of rotation.

15. The tire assembly of claim 14, wherein pumped air from the sequentially flattened air tube is alternately directed to the inlet device and exhausted from the air passageway or directed to the outlet device and channeled into the tire cavity.

16. A self-inflating tire assembly comprising:
a rim having a tire mounting surface extending between first and second rim flanges;
a tire mounted to the rim tire mounting surface, the tire having a tire cavity, first and second sidewalls extending respectively from first and second tire bead regions to a tire tread region;
an annular air tube connected to the tire and defining an annular air passageway, the air tube comprising an air inlet device within the air passageway for admitting air into the passageway and exhausting air from the passageway; and an outlet device within the air passageway positioned substantially 180 degrees opposite to the inlet device, the outlet device operative in an open condition to deliver air to the tire cavity; the air tube being composed of a flexible material operative to allow an air tube segment opposite a tire footprint to flatten and substantially close the annular passageway whereby the air tube is sequentially flattened to pump air from the sequentially flattened air tube along the air passageway in a direction counter to the direction of tire rotation.

17. The tire assembly of claim 16, wherein air is pumped from the sequentially flattened air tube along the annular air passageway in either a forward tire direction rotation or a reverse tire direction of rotation.

* * * * *